(12) United States Patent
Djelouah et al.

(10) Patent No.: US 11,475,543 B2
(45) Date of Patent: Oct. 18, 2022

(54) IMAGE ENHANCEMENT USING NORMALIZING FLOWS

(71) Applicants: Disney Enterprises, Inc., Burbank, CA (US); ETH Zurich, Zurich (CH)

(72) Inventors: Abdelaziz Djelouah, Zürich (CH); Leonhard Markus Helminger, Zürich (CH); Michael Bernasconi, Valendas (CH); Christopher Richard Schroers, Zürich (CH)

(73) Assignees: Disney Enterprises, Inc., Burbank, CA (US); ETH Zurich, Zurich (CH)

( * ) Notice: Subject to any disclaimer, the term of this patent is extended or adjusted under 35 U.S.C. 154(b) by 188 days.

(21) Appl. No.: 16/918,830

(22) Filed: Jul. 1, 2020

(65) Prior Publication Data
US 2022/0005161 A1    Jan. 6, 2022

(51) Int. Cl.
*G06T 5/00* (2006.01)
*G06T 3/40* (2006.01)

(52) U.S. Cl.
CPC ............ *G06T 5/005* (2013.01); *G06T 3/4053* (2013.01); *G06T 5/002* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2019/0318476 A1* | 10/2019 | Isgum | .................. | A61B 6/504 |
| 2020/0310370 A1* | 10/2020 | Bogo | ................ | G05B 13/0265 |
| 2020/0327440 A1* | 10/2020 | Cao | .................... | G06K 9/6256 |
| 2020/0356634 A1* | 11/2020 | Srinivasan | ............. | G06F 40/44 |
| 2020/0366914 A1* | 11/2020 | Schroers | .................. | G06N 3/02 |
| 2021/0019619 A1* | 1/2021 | Bhattacharyya | ....... | G06N 20/00 |

(Continued)

FOREIGN PATENT DOCUMENTS

| | | | | |
|---|---|---|---|---|
| EP | 3767541 A1 * | 1/2021 | ............. | G06F 17/18 |
| WO | WO-2020231691 A1 * | 11/2020 | ............... | G06N 3/02 |

OTHER PUBLICATIONS

Lugmayr, Andreas • Danelljan, Martin • Van Gool, Luc • Timofte, Rau, "SRFlow: Learning the Super-Resolution Space with Normalizing Flow", https://doi.org/10.48550/arXiv.2006.14200, Jun. 25, 2020 (Year: 2020).*

(Continued)

*Primary Examiner* — Jiangeng Sun
(74) *Attorney, Agent, or Firm* — Farjami & Farjami LLP (57) ABSTRACT

According to one implementation, an image enhancement system includes a computing platform including a hardware processor and a system memory storing a software code configured to provide a normalizing flow based generative model trained using an objective function. The hardware processor executes the software code to receive an input image, transform the input image to a latent space representation of the input image using the normalizing flow based generative model, and perform an optimization of the latent space representation of the input image to identify an enhanced latent space representation of the input image. The software code then uses the normalizing flow based generative model to reverse transform the enhanced latent space representation of the input image to an enhanced image corresponding to the input image.

20 Claims, 4 Drawing Sheets

(56) References Cited

U.S. PATENT DOCUMENTS

2021/0081804 A1* 3/2021 Stojevic ............... G06N 3/088
2021/0374551 A1* 12/2021 Vijil ................... G06K 9/6267

OTHER PUBLICATIONS

"Deep Image Prior" by Ulyanov et al. (IEEE Conference on Computer Vision and Pattern Recognition 2018).
"Density estimation using real NVP" by Dinh et al. (ICLR 2017).
"Glow: Generative flow with invertible 1x1 convolutions" by Diederik P. Kingma and Prafulla Dhariwal. (NeurIPS 2018).
"Nice: Non-linear independent components estimation" by Dinh et al. (arXiv 2014).
"Variational inference with normalizing flows" by Rezende et al. (ICML 2015).

* cited by examiner

Fig. 3

IMAGE ENHANCEMENT USING NORMALIZING FLOWS

BACKGROUND

Image restoration and image enhancement have seen significant progress due to recent developments in the field of deep neural networks. Nevertheless, most conventional techniques rely on the availability of training data in the form of pairs of images with and without degradation. As a result, the applicability of conventional image restoration and image enhancement techniques is limited to use cases in which training data can be obtained and in which the type of image degradation to be reversed can be identified in advance. Unfortunately, for historically valuable or artistically significant legacy images, that information is often impossible to obtain due to unavailability of non-degraded original imagery. Thus, there is a need in the art for image enhancement solutions that do not require foreknowledge of the type or the extent of degradation that an image has undergone.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing image enhancement using normalizing flows that overcome the drawbacks and deficiencies in the conventional art. It is noted that, in some implementations, the methods disclosed by the present application may be performed as substantially automated processes by substantially automated systems. It is further noted that, as used in the present application, the terms "automation," "automated", and "automating" refer to systems and processes that do not require the participation of a human user, such as a system operator. Although, in some implementations, a human system operator or administrator may review the performance of the automated systems described herein, that human involvement is optional. Thus, the methods described in the present application may be performed under the control of hardware processing components of the disclosed automated systems.

Moreover, as defined in the present application, an artificial neural network, also known simply as a neural network (hereinafter "NN"), is a type of machine learning framework in which patterns or learned representations of observed data are processed using highly connected computational layers that map the relationship between inputs and outputs. A "deep neural network," in the context of deep learning, may refer to a neural network that utilizes multiple hidden layers between input and output layers, which may allow for learning based on features not explicitly defined in raw data. As used in the present application, a feature labeled as an NN refers to a deep neural network. In various implementations, NNs may be utilized to perform image processing or natural-language processing.

According to implementations of the present inventive concepts, a software code including one or more NNs may be configured to provide a normalizing flow based generative model for performing image enhancement. As known in the art, a normalizing flow refers to the transformation of a probability density as the result of a series of invertible and differentiable mappings. In normalizing flow, the objective is to map a simple distribution to a more complex one, which is typically done through a change of variable. Normalizing flows may be conditional or unconditional. Conditional normalizing flows are a class of normalizing flows for which the base density to output space mapping is conditioned on an input "c", to model conditional densities $p(x|c)$. Conditional normalizing flows are efficient in sampling and inference.

Figure 1:
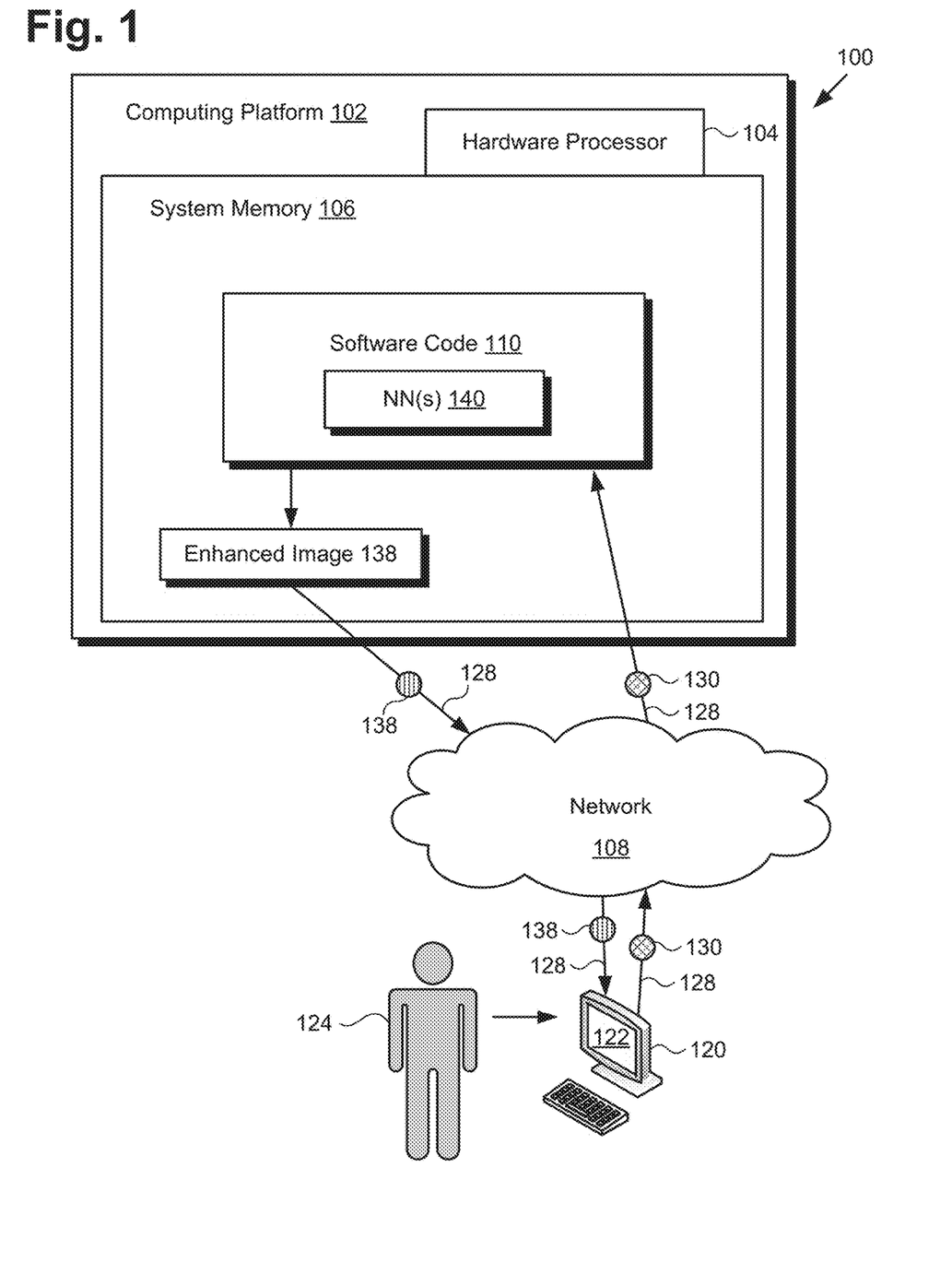
FIG. 1 shows a diagram of an exemplary system for performing image enhancement using normalizing flows, according to one implementation.

FIG. 1 shows a diagram of an exemplary system for performing image enhancement using normalizing flows, according to one implementation. As discussed below, image enhancement system 100 may be implemented using a computer server accessible over a local area network (LAN) or may be implemented as a cloud-based system. As shown in FIG. 1, image enhancement system 100 includes computing platform 102 having hardware processor 104, and system memory 106 implemented as a non-transitory storage device. According to the present exemplary implementation, system memory 106 stores software code 110 including one or more NNs 140 (hereinafter "NN(s) 140") configured to provide a normalizing flow based generative model.

As further shown in FIG. 1, image enhancement system 100 is implemented within a use environment including communication network 108, as well as user system 120 including display 122. Also shown in FIG. 1 are network communication links 128 interactively connecting user system 120 and image enhancement system 100 via communication network 108, input image 130, enhanced image 138 corresponding to input image 130 and produced using software code 110, and user 124 of user system 120.

It is noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110 as being stored in its entirety in system memory 106, that representation is also provided merely as an aid to conceptual clarity. More generally, image enhancement system 100 may include one or more computing platforms 102, such as computer servers for example, which may be co-located, or may form an interactively linked but distributed system, such as a cloud-based system, for instance.

As a result, hardware processor 104 and system memory 106 may correspond to distributed processor and memory resources within image enhancement system 100. Thus, it is to be understood that various features of software code 110 may be stored and executed using the distributed memory and processor resources of image enhancement system 100.

According to the implementation shown by FIG. 1, user 124 may utilize user system 120 to interact with image enhancement system 100 over communication network 108. In one such implementation, computing platform 102 may correspond to one or more web servers, accessible over a packet-switched network such as the Internet, for example. Alternatively, computing platform 102 may correspond to one or more computer servers supporting a wide area network (WAN), a LAN, or included in another type of limited distribution or private network.

Although user system 120 is shown as a desktop computer in FIG. 1, that representation is also provided merely as an example. More generally, user system 120 may be any suitable mobile or stationary computing device or system that implements data processing capabilities sufficient to provide a user interface, support connections to communication network 108, and implement the functionality ascribed to user system 120 herein. For example, in other implementations, user system 120 may take the form of a laptop computer, tablet computer, or smartphone, for example. User 124 may utilize user system 120 to interact with image enhancement system 100 to use software code 110, executed by hardware processor 104, to produce enhanced image 138 corresponding to input image 130.

It is noted that, in various implementations, enhanced image 138, when generated using software code 110, may be stored in system memory 106, may be copied to non-volatile storage, or may be stored in system memory 106 and also be copied to non-volatile storage. Alternatively, or in addition, as shown in FIG. 1, in some implementations, enhanced image 138 may be sent to user system 120 including display 122, for example by being transferred via network communication links 128 of communication network 108.

With respect to display 122 of user system 120, display 122 may be physically integrated with user system 120 or may be communicatively coupled to but physically separate from user system 120. For example, where user system 120 is implemented as a smartphone, laptop computer, or tablet computer, display 122 will typically be integrated with user system 120. By contrast, where user system 120 is implemented as a desktop computer, display 122 may take the form of a monitor separate from user system 120 in the form of a computer tower. Moreover, display 122 may be implemented as a liquid crystal display (LCD), a light-emitting diode (LED) display, an organic light-emitting diode (OLED) display, or any other suitable display screen that performs a physical transformation of signals to light.

By way of overview, the present application discloses image enhancement techniques that model the distribution of high quality images using a normalizing flow based generative model provided by software code 110. The objective of the model is to learn how target images should look. The image enhancement process may then be expressed as an optimization problem with the aim of estimating a degradation free enhanced image 138 that is both close to input image 130 and fits the distribution learned from the target high quality image space.

As noted above, a normalizing flow refers to the transformation of a probability density as the result of a series of invertible mappings, such as bijective mappings, for example. In normalizing flow, the objective is to map a simple distribution to a more complex one. This may be done through a change of variable. For exemplary purposes, consider two random variables Y and Z that are related through the invertible transformation $f: \mathbb{R}^d \to \mathbb{R}^d$, then the two variables are related as follows:

$$p_Y(y) = p_Z(f^{-1}(z)) \left| \det\left( \frac{\partial f(x)}{\partial x} \right) \right|, \quad \text{(Equation 1)}$$

where the determinant preserves the total probability and can be understood as the amount of squeezing and stretching of the space by the function $f$.

In normalizing flow, a series $f_n, \ldots, f_1$ of such mapping is applied to transform a simple probability distribution into a more complex multi-modal distribution.

$$z_n = f_n \circ \ldots \circ f_1(z_0) \quad \text{(Equation 2)}$$

$$p_n(z_n) = p_0(f^{-1}(z_0)) \prod_{i=1}^{n} \left| \det\left( \frac{\partial f_i}{\partial z_{i-1}} \right) \right|^{-1} \quad \text{(Equation 3)}$$

Computation of the determinant of these Jacobian matrices, as well as the function inverses, must remain easy to allow their integration as part of an NN. However, ease of computation is not assured for arbitrary Jacobians, and recent developments and successes in normalizing flow are due to the use of invertible transformations having determinants that are easy to compute. Coupling layers are a type of such invertible bijective functions that are tractable and flexible. There exist several variations of coupling layers but the core idea is to split the input into two partitions, where one conditions an NN to modify the remaining channels. This leads to an upper or lower diagonal Jacobian matrix with a determinant that is easy to compute.

Figure 2:
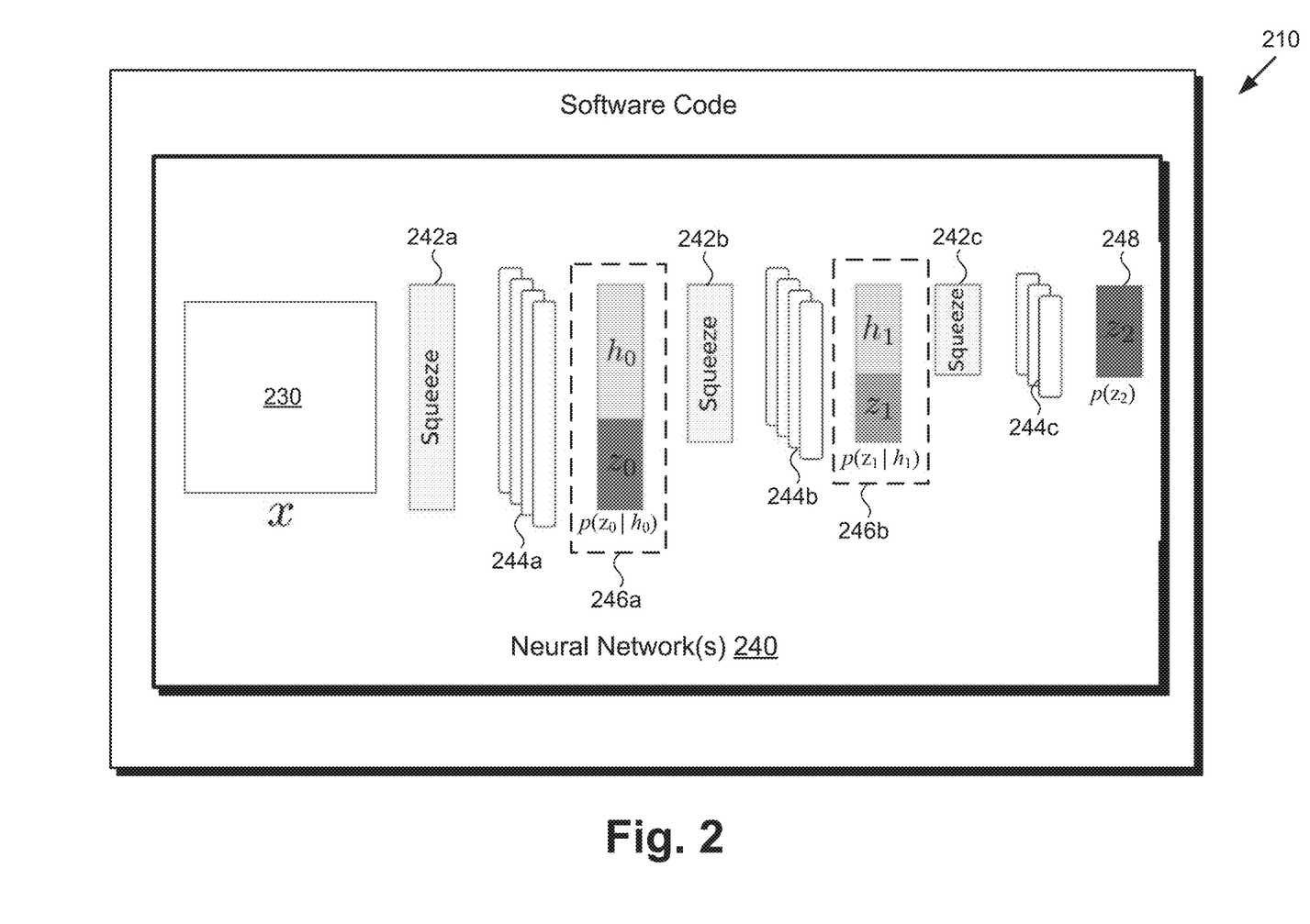
FIG. 2 shows an exemplary diagram of a software code suitable for execution by a hardware processor of the image enhancement system shown in FIG. 1, according to one implementation.

Referring now to FIG. 2, FIG. 2 shows exemplary software code 210 suitable for execution by hardware processor 104 of image enhancement system 100, in FIG. 1, according to one implementation. As shown in FIG. 2, software code 210 includes one or more NNs 240 (hereinafter "NN(s) 240") providing a normalizing flow based generative model configured to enhance input image 230 by transforming the complex image space distribution of input image 230 (hereinafter also referred to as "input image x" and "$x_{input}$") to latent space representation 248 "$z_2$" of input image x. Also shown in FIG. 2 are layers 242a, 242b, and 242c, channels

244a. 244b, and 244c, and factor-out layers 246a and 246b. It is noted that the probability distributions to be learned are $p(z_2)$, $p(z_1|h_1)$, and $p(z_0|h_0)$.

Layer 242a is configured to reorganize the image space representation of input image x into channels 244a, which are fed to factor-out layer 246a. Layer 242b receives the output of factor-layer 246a and reorganizes that intermediate representation of input image x into channels 244b, which are fed to factor-out layer 246b. Analogous processes continue until transformation of input image 230 to latent space representation 248 of input image 230 is achieved.

The objective of factor-out layers 246a and 246b is to allow a coarse-to-fine modeling and a simplification of the representation by further processing only a part of the input features. As shown in FIG. 2, the input features of each of factor-out layers 246a and 246b is split into two parts h and z. Formally this is expressed for one level as $$[z_0, h_0] = f_0^{-1}(x) \text{ and } z_1 = f_1^{-1}(h_0) \quad \text{(Equation 4)}$$

and the latent representation is $z = [z_0; z_1; z_2]$. In addition to computational efficiency this also defines a conditional dependency between the latents.

Input image 230 and software code 210 including NN(s) 240 correspond respectively in general to input image 130 and software code 110 including NN(s) 140, in FIG. 1, and those features may share any of the characteristics attributed to either corresponding feature by the present disclosure. That is to say, like NN(s) 240, NN(s) 140 may be configured to provide a normalizing flow based generative model for enhancing input image 130/230 by transforming the complex image space distribution of input image 130/230 to latent space representation 248 of input image 130/230. Moreover, like NN(s) 240. NN(s) 140 may include features corresponding respectively to layers 242a, 242b, and 242c, channels 244a. 244b, and 244c, and factor-out layers 246a and 246b.

Input image 130/230, x, may be thought of as a high-dimensional random vector having an unknown distribution $p(x)$. For a dataset of N images, the objective is to learn a parametrized distribution $p_\theta(x)$ from this discrete set of samples, by minimizing the following negative log-likelihood objective:

$$\mathcal{L} = \frac{1}{N} \sum_{i=1}^{N} -\log p_\theta(x^{(i)}) \quad \text{(Equation 5)}$$

where θ are the parameters of NN(s) 140/240.

Equation 5 can be extended to continuous data using the modified negative log-likelihood objective:

$$\mathcal{L} \simeq \frac{1}{N} \sum_{i=1}^{N} -\log p_\theta(x^{(i)} + u) \quad \text{(Equation 6)}$$

with u being uniformly sampled noise in the interval [0, a], where a is determined by the discretization level of the data. By way of example, for images with integer values for the colors, a would typically be between 0 and 1.0.

In normalizing flow based generative modeling, the observations x are generated from a latent space representation z:

$$x = f(x) \text{ with } z \sim p(z) \quad \text{(Equation 7)}$$

where $f_\theta$ is an invertible function and $p_\theta(z)$ is a tractable distribution. Expressing $f$ as a sequence of bijective differentiable transformations shows the great potential of using normalizing flows as generative models.

Figure 3:
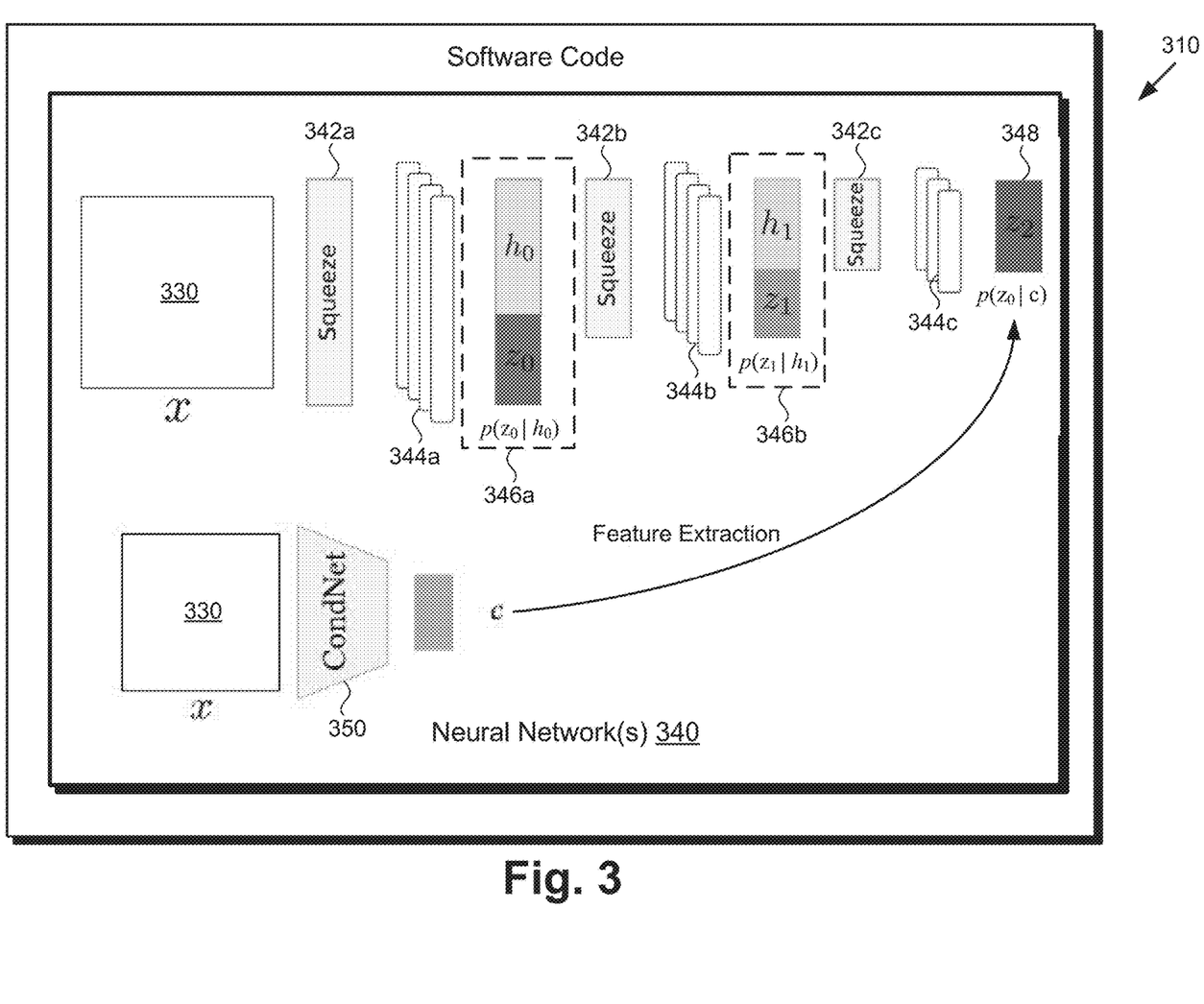
FIG. 3 shows an exemplary diagram of a software code suitable for execution by a hardware processor of the image enhancement system shown in FIG. 1, according to another implementation.

As noted above, normalizing flows may be conditional or unconditional. NN(s) 240, in FIG. 2 includes only non-conditional or "unconditional" normalizing flows. By contrast, and as also noted above, conditional normalizing flows are a class of normalizing flows for which the base density to output space mapping is conditioned on an input "c", to model conditional densities $p(x|c)$. Referring to FIG. 3, FIG. 3 shows an example of software code 310 including one or more NNs 340 (hereinafter "NN(s) 340") providing conditional normalizing flows.

NN(s) 340 provide a conditional normalizing flow based generative model configured to enhance input image 330 by transforming the complex image space distribution of input image 330 to latent space representation 348 of input image 330. As shown in FIG. 3, NN(s) 340 include layers 342a, 342b, and 342c, channels 344a, 344b, and 344c, and factor-out layers 346a and 346b, as well as conditional network 350 (hereinafter "CondNet 350"). It is noted that the probability distributions to be learned in the present implementation are $p(z_0|c)$, $p(z_1|h_1)$, and $p(z_0|h_0)$.

Input image 330 and software code 310 including NN(s) 340 correspond respectively in general to input image 130 and software code 110 including NN(s) 140, in FIG. 1, and those features may share any of the characteristics attributed to either corresponding feature by the present disclosure. That is to say, like NN(s) 340, NN(s) 140 may provide a conditional normalizing flow based generative model configured to enhance input image 130/330 by transforming the complex image space distribution of input image 130/330 to latent space representation 348 of input image 130/330. Moreover, like NN(s) 340, NN(s) 140 may include features corresponding respectively to layers 342a, 342b, and 342c, channels 344a. 344b, and 344c, factor-out layers 346a and 346b, and CondNet 350.

Layers 342a, 342b, and 342c, channels 344a. 344b, and 344c, and factor-out layers 346a and 346b correspond respectively in general to layers 242a. 242b, and 242c, channels 244a. 244b, and 244c, and factor-out layers 246a and 246b in FIG. 2. Consequently, layers 342a, 342b, and 342c, channels 344a. 344b, and 344c, and factor-out layers 346a and 346b may share any of the characteristics attributed to respective layers 242a. 242b, and 242c, channels 244a, 244b, and 244c, and factor-out layers 246a and 246b by the present disclosure, and vice versa.

It is noted that the specific layers discussed above, i.e., coupling layers and factor-out layers, are merely exemplary, and are not to be interpreted as limitations on the types of layers that may be included in NN(s) 140/240/340. More generally, any NN layer that is a bijective function allowing progression through a normalizing flow framework may be utilized in place of layers 242a/342a. 242b/342b, and 242c/342c, as well as in place of factor-out layers 246a/346a and 246b/346b.

With respect to the conditional normalizing flow used in the exemplary implementation shown in FIG. 3, it is further noted that, given prior knowledge "c" about the image x, a conditional distribution $p(x|c)$ can be learned. In other words, given certain information a more specific probability distribution can be learned. For example, the probability of x given the prior knowledge that a specific object, e.g., a dog or a horse, is contained in input image x.

Consider a dataset of N images. The objective is then to learn a parameterized distribution $p_\theta(x|c)$ from this set, by minimizing the negative log-likelihood objective:

$$\mathcal{L} = \frac{1}{N}\sum_{i=1}^{N} -\log p_\theta(x^{(i)} | c^{(i)}) \qquad \text{(Equation 8)}$$

with $c^{(i)}$ being the prior information about the image x, and with θ being the parameters of NN(s) 140/340. It is noted that although the prior information used in the conditional normalizing flow approach shown in FIG. 3 can be arbitrary information about the content, the normalizing flow based generative model is trained to learn to extract features $c^{(i)}$=CondNet($x^{(i)}$) from input image x.

Thus, and as shown by FIG. 2, in some implementations, the normalizing flow based generative model provided by software code 110/210 may include an unconditional normalizing flow but not a conditional normalizing flow. Conversely, and as shown by FIG. 3 in some implementations, the normalizing flow based generative model provided by software code 110/310 may include a conditional normalizing flow but not an unconditional normalizing flow. As yet another alternative, and as discussed in greater detail below, in some implementations, the normalizing flow based generative model provided by software code 110 may include both an unconditional normalizing flow and a conditional normalizing flow.

Unconditional normalizing flows learn the distribution of the images $p_\theta(x)$ and may be trained by minimizing the negative log-likelihood objective given by Equation 6 above, while conditional normalizing flows learn the distribution of the images $p_\theta(x)$ and may be trained by minimizing the negative log-likelihood objective given by Equation 8 above. In both implementations, however, image enhancement may be further optimized by an objective function that combines the negative log-likelihood term of Equations 6 or 8 with one or more loss terms. Examples of such loss terms can include a latent-noise-loss term, an image-noise-loss term, and an auto-encoder-loss term.

Latent-Noise-Loss "$\mathcal{L}_{ln}$": In order to improve the robustness (prevent delta functions) of the latent space, uniform noise u may be added to the latents $\tilde{z}=f^{-1}(x)+u$ where $u \sim \mathcal{U}(-0.5, 0.5)$. The decodings of the degraded encodings $\tilde{z}$ should be close to the input image x:

$$\mathcal{L}_{ln}=\|f(\tilde{z})-x\|_2 \qquad \text{(Equation 9)}$$

Image-Noise-Loss "$\mathcal{L}_{in}$": The robustness of the normalizing flow based generative model against degraded images may be enhanced by minimizing the distance of the encoding $z=f^{-1}(x)$ and $\hat{z}=f^{-1}(\tilde{x})$, the encoding of a degraded image $\tilde{x}=x+u$ where $u \sim \mathcal{U}(-10, 10)$. It is noted that $x \in [0, 255]^{H \times W \times C}$ and the values of $\tilde{x}$ are typically not clipped to the interval [0, 255].

$$\mathcal{L}_{in}=\|\hat{z}-z\|_2 \qquad \text{(Equation 10)}$$

Auto-Encoder-Loss "$\mathcal{L}_{ae}$": The auto-encoder-loss forces the normalizing flow based generative model to store as much information in the deepest level (e.g. $z_2$ in FIGS. 2 and 3). This can be accomplished by minimizing the Mean Squared Error (MSE) between the input image x and the image obtained when decoding the latents of the deepest level x'. It is noted that the computation of x' differs slightly for the unconditional and conditional normalizing flows.

For unconditional normalizing flows, the x' may be computed by decoding the deepest level $z_L$ and the most probable encodings for the intermediate levels. Hence, the full decoded image relies only on the information saved in the bottleneck. The intermediate encodings $z'_l$ are obtained by taking the most likely sample from the learned distributions $z'_l \sim p(z_l|h_l)$.

For conditional normalizing flows, first the image features c=ConNet(x) are extracted and the most likely encoding of the distribution $z'_L \sim p(z_L|c)$ is computed. The most likely samples of the distributions $z'_l \sim p(z_l|h_l)$ may be used for the remaining encodings. The decoding x' is then computed by x'=f(z') where $z'=[z'_0, \ldots, z'_L]$.

The auto-encoder loss $\mathcal{L}_{ae}$ can be computed as follows:

$$\mathcal{L}_{ae}=\|x'-x\|_2 \qquad \text{(Equation 11)}$$

The objective function used to train the unconditional normalizing flow based generative model provided by software code 110/210 may include the negative log-likelihood term (hereinafter "$\mathcal{L}_{NLL}$") given by Equation 6 in combination with one or more of Equations 9, 10, and 11. The objective function used to train the conditional normalizing flow based generative model provided by software code 110/310 may include the $\mathcal{L}_{NLL}$ term given by Equation 8 in combination with one or more of Equations 9, 10, and 11.

For example, in some implementations, the objective function used to train the normalizing flow based generative model provided by software code 110/210/310 may be expressed as a weighted sum of the $\mathcal{L}_{NLL}$ term given by one of Equations 6 or 8 with one or more of Equations 9, 10, and 11. In one implementation, such an objective function may be expressed as a weighted sum of the $\mathcal{L}_{NLL}$ term given by one of Equations 6 or 8 with each of the latent-noise-loss term, the image-noise-loss term, and the auto-encoder-noise loss term given by respective Equations 9, 10, and 11 as:

$$\mathcal{L}=\mathcal{L}_{NLL}+\beta_{ln}\mathcal{L}_{ln}+\beta_{in}\mathcal{L}_{in}+\beta_{ae}\mathcal{L}_{ae} \qquad \text{(Equation 12)}$$

where $\beta_{ln}$, $\beta_{in}$, and $\beta_{ae}$ are the weighting factors for the loss terms given by respective Equations 9, 10, and 11.

Figure 4:
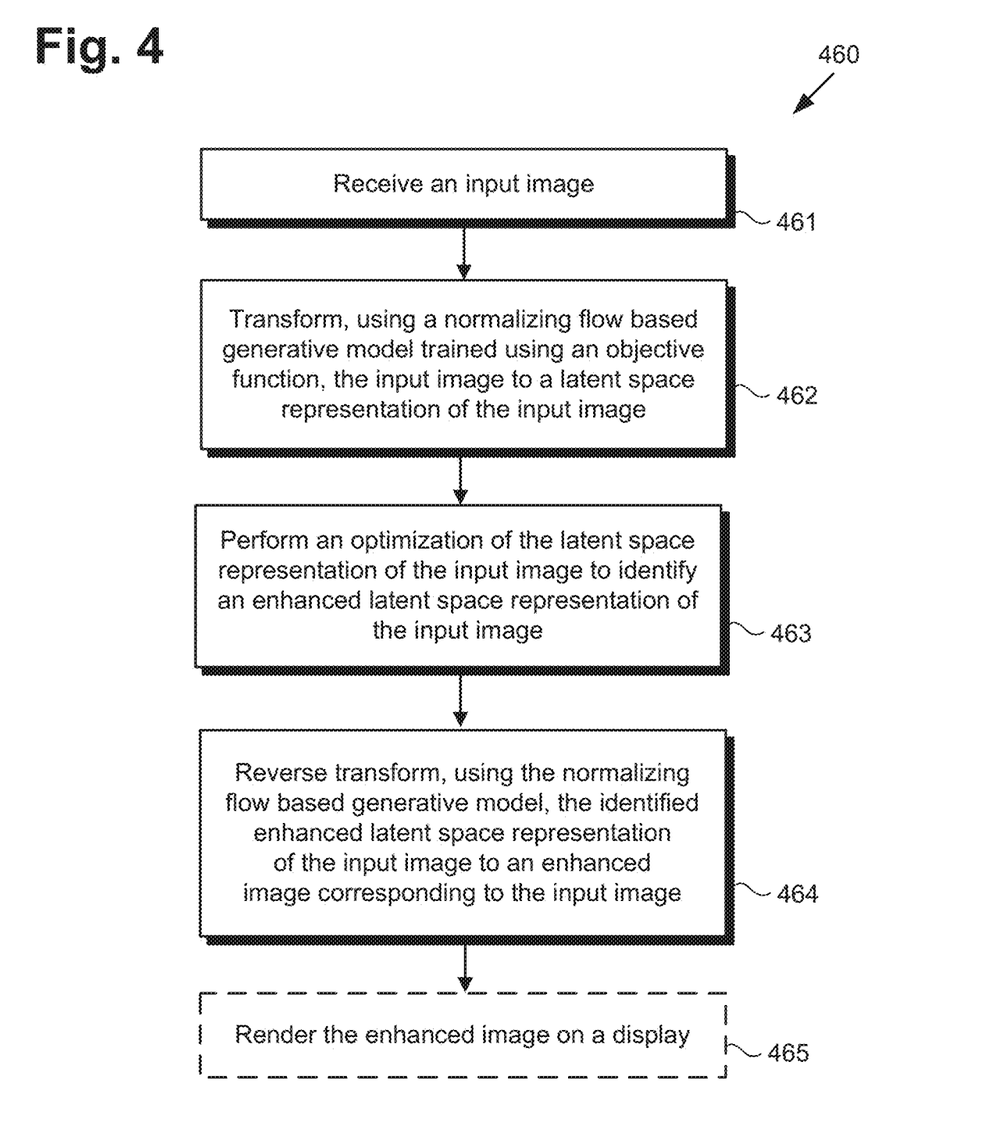
FIG. 4 shows a flowchart presenting an exemplary method for performing image enhancement using normalizing flows, according to one implementation.

The functionality of software code 110/210/310 including NN(s) 240 or NN(s) 340 will be further described by reference to FIG. 4 in combination with FIGS. 1, 2, and 3. FIG. 4 shows flowchart 460 presenting an exemplary method for performing image enhancement using normalizing flows, according to one implementation. With respect to the method outlined in FIG. 4, it is noted that certain details and features have been left out of flowchart 460 in order not to obscure the discussion of the inventive features in the present application.

Referring now to FIG. 4 in combination with FIGS. 1, 2, and 3, flowchart 460 begins with receiving input image 130/230/330 (action 461). By way of example, user 124 may utilize user system 120 to interact with image enhancement system 100 in order to produce enhanced image 138 corresponding to input image 130/230/330, which may be a digital photograph or one or more video frames, for instance. As shown by FIG. 1, in one implementation, user 124 may transmit input image 130/230/330 from user system 120 to image enhancement system 100 via communication network 108 and network communication links 128. Alternatively, input image 130/230/330 may be received from a third party source, or may be stored in system memory 106. Input image 130/230/330 may be received by NN(s) 140/240 of software code 110/210 or by NN(s) 140/340 of software code 110/310, executed by hardware processor 104.

Flowchart 460 continues with transforming input image 130/230/330 to latent space representation 248/348 of input image 130/230/330 using the normalizing flow based generative model provided by NN(s) 140/240 of software code 110/210 or by NN(s) 140/340 of software code 110/310, that normalizing flow based generative model having been trained using an objective function, which in one example, may include a combination of a negative log-likelihood term with one or more of a latent-noise-loss term, an image-noise-loss term, or an auto-encoder-loss term (action 462). In general terms, image enhancement may be performed by solving the following optimization problem:

$$x^* = \underset{x}{\operatorname{argmin}}[-\log p_\theta(x) + \lambda \mathcal{L}_{data}(x_{input}, x)] \quad \text{(Equation 13)}$$

with $x_{input}$ being the degraded input image 130/230/330 and $\mathcal{L}_{data}$ being a data fidelity term with weighting factor $\lambda$. The magnitude of $\lambda$ can be set manually according to size and content and can be adapted to different image enhancement applications. It is noted that the specific expression of the data fidelity term $\mathcal{L}_{data}$ can vary depending on the particular image enhancement technique being performed, as further described below.

Optimization in image space is difficult. Nevertheless, thanks to the normalizing flow based generative model provided by software code 110/210/310 a bijective mapping $f_\theta$ from the image space to latent space has been learned. As a result, the optimization problem to be solved may be expressed with respect to the latent z as:

$$z^* = \underset{z}{\operatorname{argmin}}[-\log p_\theta(f_\theta(z)) + \lambda \mathcal{L}_{data}(x_{input}, f_\theta(z))] \quad \text{(Equation 14)}$$

With this new formulation, the capacity of normalizing flows to map a complex input space (the image space) to a simpler one (the latent space) that follows a simpler distribution is being used advantageously. This new space, i.e., the latent space, is more adapted for such optimization problems. Transformation of input image 130/230/330 to latent space representation 248/348 of input image 130/230/330 in action 462 may be performed by NN(s) 140/240 of software code 110/210 or by NN(s) 140/340 of software code 110/310, executed by hardware processor 104.

Flowchart 460 continues with performing an optimization of latent space representation 248/348 of input image 130/230/330 to identify an enhanced latent space representation of the input image (action 463). In one implementation, for example, the optimization of action 463 may be performed through an iterative procedure in which gradient descent is applied to the latents according to:

$$z^{t+1} = z^t - \eta \nabla_z L(\theta, z, x_{input}) \quad \text{(Equation 15)}$$

where $L(\theta, z, x_{input})$ is the objective defined in Equation 14, above, and $\eta$ is the weighting applied to the gradient. In one implementation, the Adam optimizer known in the art may be utilized to solve the problem, with learning rate $\eta = 1e^{-1}$, for example. This is merely one of the several options for solving this problem, however. The approach described above is generic with respect to image enhancement. Once the system is trained on high quality data, different specific image enhancement applications can be considered by adapting the data fidelity term $\mathcal{L}_{data}$ as described below.

It is noted that the update procedure described above is more stable if the latents are updated in a coarse-to-fine fashion. Hence, the optimizing procedure may begin with considering only the deepest level. That deepest level contains coarse information about the image and should already give a good estimate. After convergence of the first level, the latents of the next level can be added and both levels can be optimized. This progressive procedure can be applied until the topmost level is reached. The optimization performed in action 463 may be performed by software code 110/210 or by software code 110/310, executed by hardware processor 104.

In some implementations, flowchart 460 can conclude with reverse transforming the enhanced latent space representation of the input image identified in action 463 to enhanced image 138 corresponding to input image 130/230/330, using the normalizing flow based generative model (action 464). Action 464 may be performed by NN(s) 140/240 of software code 110/210 or by NN(s) 140/340 of software code 110/310, executed by hardware processor 104, and may result in enhanced image 138 being a restored image corresponding to input image 130/230/330. That is to say, in some implementations, input image 130/230/330 may be a degraded image, and enhanced image 138 may be a restored image corresponding to the degraded image.

As one specific example of image restoration, enhanced image 138 corresponding to degraded input image 130/230/330 may be a denoised image corresponding to input image 130/230/330. In such an application, the data fidelity term $\mathcal{L}_{data}$ can simply be expressed as an image distortion loss between the input image 130/230/330, i.e., $x_{input}$ and the restored result $x = f_\theta(z)$ providing enhanced image 138. Using MSE, $\mathcal{L}_{data}$ may be expressed as:

$$\mathcal{L}_{data}(x_{input}, f_\theta(z)) = \|x_{input} - f_\theta(z)\|_2 \quad \text{(Equation 16)}$$

As another specific example of image restoration, enhanced image 138 corresponding to degraded image 130/230/330 may be an inpainted image corresponding to input image 130/230/330. For instance, given a mask m identifying a region of input image 130/230/330 to be filled, the data fidelity term $\mathcal{L}_{data}$ may be expressed as:

$$\mathcal{L}_{data}(x_{input}, f_\theta(z)) = m \odot \|x_{input} - f_\theta(z)\|_2 \quad \text{(Equation 17)}$$

where the operator $\odot$ is the Hadamard product known in the art. The mask m may be a binary mask that takes value 0 for the region to be inpainted and 1 everywhere else.

In some implementations, the normalizing flow based generative model provided by software code 110/210 or 110/310 may be utilized to perform super-resolution of input image 130/230/330. In those implementations, input image 130/230/330, $x_{input}$, corresponds to a downscaling of enhanced image 138, $x = f_\theta(z)$. This is reflected in another expression for the data fidelity term $\mathcal{L}_{data}$:

$$\mathcal{L}_{data}(x_{input}, f_\theta(z)) = \|x_{input} - d(f_\theta(z))\|_2 \quad \text{(Equation 18)}$$

which this time measures the distortion between $x_{input}$ and d(x), which is the downscaling of x. In the super-resolution case the normalizing flow based generative model is used to learn the distribution of image patches in high resolution content.

Referring to Equation 15, above, it is noted that the final result, as well as the time to convergence of the iterative procedure described in Equation 15, depends on the initial encoding $z^{(0)}$. In the worst case, a strongly degraded and noisy image, $x_{input}$, could lead to a divergence and hence to a suboptimal result. To overcome this problem, a conditional normalizing flow and an unconditional normalizing flow may be used in combination. This approach utilizes the robustness of the conditional normalizing flow to predict a less degraded image. That prediction is then used as the starting point for the image enhancement procedure performed using the unconditional normalizing flow.

Thus, in some implementations, the normalizing flow based generative model provided by software code 110/210/310 may include both an unconditional normalizing flow and a conditional normalizing flow. Moreover, in some such implementations, the normalizing flow based generative model may be configured to feed an output of the conditional normalizing flow to an input of the unconditional normalizing flow.

It is further noted that although one of the significant advantages of the present novel and inventive image enhancement solution over the conventional state-of-the-art is the ability of the present solution to learn a prior on the target space, i.e., degradation-free images, and to use that model for image restoration. It is also possible to make use of priors on the degradation when that data is available. For example in the case of noise, a probability model can be available or learned, and the optimization problem expressed by Equation 14 above can be adapted to become:

$$z^* = \underset{z}{\mathrm{argmin}} [-\log p_\theta(f_\theta(z)) - \log p_{\theta_n}(x_{residual}) + \lambda \mathcal{L}_{data}(x_{input}, f_\theta(z))]$$

(Equation 19)

In contrast to Equation 14, Equation 19 also takes into account the residual: $x_{residual} = x_{input} - f_\theta(z)$. This residual corresponds to the noise in the image and should be likely under the considered noise distribution $p_{\theta_n}$. The present approach can be extended to any degradation where a distribution is available.

As noted above, in some implementations, flowchart 460 can conclude with action 464. However, referring to FIG. 1 in combination with FIG. 4, in other implementations the method outlined by flowchart 460 may continue and conclude with rendering enhanced image 138 on a display, such as display 122 of user system 120 (action 465). As also noted above, display 122 may be implemented as an LCD, LED display, or an OLED display, for example. Moreover, in some implementations display 122 may take the form of a high-definition (HD) display, or an Ultra HD display such as a 4K or 8K resolution display.

In some implementations, user system 120 including display 122 may be integrated with image enhancement system 100 such that display 122 may be controlled by hardware processor 104 of computing platform 102. In other implementations, as noted above, software code 110 may be stored on a computer-readable non-transitory medium, and may be accessible to the hardware processing resources of user system 120. In those implementations, the rendering of enhanced image 138 on display 122 may be performed by software code 110, executed either by hardware processor 104 of computing platform 102, or by a hardware processor of user system 120.

It is noted that, in some implementations, hardware processor 104 may execute software code 110/210/310 to perform actions 461, 462, 463, and 464, or actions 461, 462, 463, 464, and 465 in an automated process from which human involvement may be omitted.

Thus, the present application discloses systems and methods for performing image enhancement using normalizing flows that overcome the drawbacks and deficiencies in the conventional art. In marked and advantageous contrast to the conventional state-of-the-art, the present normalizing flow based image enhancement solution does not require any information regarding the degradation present in an input image, although that information may be utilized by the present solution when available. That is to say, unlike conventional image enhancement techniques that rely on foreknowledge of the image degradation present, the normalizing flow based image enhancement solution disclosed by the present application can be used to blindly, i.e., without foreknowledge, address any type of image degradation.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image enhancement system comprising:
a computing platform including a hardware processor and a system memory;
a software code stored in the system memory, the software code configured to provide a normalizing flow based generative model trained using an objective function, the normalizing flow based generative model including both an unconditional normalizing flow and a conditional normalizing flow;
the hardware processor configured to execute the software code to:
receive an input image;
transform, using the normalizing flow based generative model, the input image to a latent space representation of the input image;
perform an optimization of the latent space representation of the input image to identify an enhanced latent space representation of the input image; and
reverse transform, using the normalizing flow based generative model, the identified enhanced latent space representation of the input image to an enhanced image corresponding to the input image.

2. The image enhancement system of claim 1, wherein the normalizing flow based generative model is configured to feed an output of the conditional normalizing flow to an input of the unconditional normalizing flow.

3. The image enhancement system of claim 1, wherein the objective function includes a combination of a negative log-likelihood term with at least one of a latent-noise-loss term, an image-noise-loss term, or an auto-encoder-loss term.

4. The image enhancement system of claim 3, wherein the combination of the negative log-likelihood term with the at least one of the latent-noise-loss term, the image-noise-loss term, or the auto-encoder-loss term comprises a weighted sum of the at least one of the negative log-likelihood term with the latent-noise-loss term, the image-noise-loss term, or the auto-encoder-loss term.

5. The image enhancement system of claim 1, wherein the input image comprises a degraded image, and the enhanced image comprises a restored image corresponding to the degraded image.

6. The image enhancement system of claim 5, wherein the restored image corresponding to the degraded image comprises a denoised image.

7. The image enhancement system of claim 5, wherein the restored image corresponding to the degraded image comprises an inpainted image.

8. The image enhancement system of claim 1, wherein the software code is configured to provide the normalizing flow based generative model to perform super-resolution of the input image.

9. A method for use by an image enhancement system including a computing platform having a hardware processor and a system memory storing a software code configured to provide a normalizing flow based generative model trained using an objective function, the normalizing flow based generative model including both an unconditional normalizing flow and a conditional normalizing flow, the method comprising:
  receiving, by the software code executed by the hardware processor, an input image;
  transforming, by the software code executed by the hardware processor and using the normalizing flow based generative model, the input image to a latent space representation of the input image;
  performing, by the software code executed by the hardware processor, an optimization of the latent space representation of the input image to identify an enhanced latent space representation of the input image; and
  reverse transforming, by the software code executed by the hardware processor and using the normalizing flow based generative model, the identified enhanced latent space representation of the input image to an enhanced image corresponding to the input image.

10. The method of claim 9, wherein the normalizing flow based generative model is configured to feed an output of the conditional normalizing flow to an input of the unconditional normalizing flow.

11. The method of claim 9, wherein the objective function includes a combination of a negative log-likelihood term with at least one of a latent-noise-loss term, an image-noise-loss term, or an auto-encoder-loss term.

12. The method of claim 9, wherein the combination of the negative log-likelihood term with the at least one of the latent-noise-loss term, the image-noise-loss term, or the auto-encoder-loss term comprises a weighted sum of the at least one of the negative log-likelihood term with the latent-noise-loss term, the image-noise-loss term, or the auto-encoder-loss term.

13. The method of claim 9, wherein the input image comprises a degraded image, and the enhanced image comprises a restored image corresponding to the degraded image.

14. The method of claim 13, wherein the restored image corresponding to the degraded image comprises a denoised image.

15. The method of claim 13, wherein the restored image corresponding to the degraded image comprises an inpainted image.

16. The method of claim 9, wherein the software code is configured to provide the normalizing flow based generative model to perform super-resolution of the input image.

17. A method for use by an image enhancement system including a computing platform having a hardware processor and a system memory storing a software code configured to provide a normalizing flow based generative model trained using an objective function, the method comprising:
  receiving, by the software code executed by the hardware processor, an input image;
  transforming, by the software code executed by the hardware processor and using the normalizing flow based generative model, the input image to a latent space representation of the input image;
  performing, by the software code executed by the hardware processor, an optimization of the latent space representation of the input image to identify an enhanced latent space representation of the input image; and
  reverse transforming, by the software code executed by the hardware processor and using the normalizing flow based generative model, the identified enhanced latent space representation of the input image to an enhanced image corresponding to the input image.

18. The method of claim 17, wherein the objective function includes a combination of a negative log-likelihood term with at least one of a latent-noise-loss term, an image-noise-loss term, or an auto-encoder-loss term.

19. The method of claim 17, wherein the combination of the negative log-likelihood term with the at least one of the latent-noise-loss term, the image-noise-loss term, or the auto-encoder-loss term comprises a weighted sum of the at least one of the negative log-likelihood term with the latent-noise-loss term, the image-noise-loss term, or the auto-encoder-loss term.

20. The method of claim 17, wherein the input image comprises a degraded image, and the enhanced image comprises a restored image corresponding to the degraded image.

* * * * *